(12) United States Patent
Wang et al.

(10) Patent No.: US 12,520,243 B2
(45) Date of Patent: Jan. 6, 2026

(54) METHODS AND APPARATUSES FOR CHANNEL ESTIMATION

(71) Applicant: Telefonaktiebolaget LM Ericsson (publ), Stockholm (SE)

(72) Inventors: Huichen Wang, Beijing (CN); Li Yi, Beijing (CN); Jie Chen, Beijing (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 394 days.

(21) Appl. No.: 18/022,698

(22) PCT Filed: Aug. 27, 2020

(86) PCT No.: PCT/CN2020/111867
§ 371 (c)(1),
(2) Date: Feb. 22, 2023

(87) PCT Pub. No.: WO2022/041065
PCT Pub. Date: Mar. 3, 2022

(65) Prior Publication Data
US 2023/0403655 A1    Dec. 14, 2023

(51) Int. Cl.
*H04W 52/24* (2009.01)
*H04W 52/36* (2009.01)
(52) U.S. Cl.
CPC ....... *H04W 52/241* (2013.01); *H04W 52/243* (2013.01); *H04W 52/365* (2013.01)
(58) Field of Classification Search
CPC ............. H04W 52/241; H04W 52/243; H04W 52/365; H04W 52/24; H04W 52/242; H04L 5/0057; H04L 1/0025; H04L 1/0026; H04B 17/336
See application file for complete search history.

(56) References Cited

U.S. PATENT DOCUMENTS

| | | | |
|---|---|---|---|
| 8,457,236 B2 * | 6/2013 | Gomadam | H04B 7/0417 375/267 |
| 9,130,698 B2 | 9/2015 | Khandekar et al. | |
| 2014/0233519 A1 * | 8/2014 | Nagata | H04B 15/00 370/329 |

(Continued)

FOREIGN PATENT DOCUMENTS

| EP | 3 079 291 A1 | 10/2016 |
|---|---|---|
| EP | 2959627 B1 | 11/2017 |

OTHER PUBLICATIONS

International Search Report and the Written Opinion of the International Searching Authority, issued in corresponding International Application No. PCT/CN2020/111867, dated May 27, 2021, 6 pages.

(Continued)

*Primary Examiner* — Fayyaz Alam
(74) *Attorney, Agent, or Firm* — Rothwell, Figg, Ernst & Manbeck, P.C.

(57) ABSTRACT

Methods and apparatuses are disclosed for channel estimation. According to an embodiment, a network node obtains, from a terminal device, a channel quality indication (CQI) value reported by the terminal device for an anchor physical resource block (PRB). The network node determines, for the anchor PRB, a first signal to interference plus noise ratio (SINR) of a downlink channel, based at least on the CQI value.

17 Claims, 12 Drawing Sheets

(56) References Cited

U.S. PATENT DOCUMENTS

2020/0022089 A1    1/2020  Guo
2021/0274556 A1*  9/2021  Park ..................... H04L 1/0026
2021/0399863 A1*  12/2021  Yu ....................... H04B 17/327
2023/0028843 A1*  1/2023  Sun ..................... H04B 7/0626

OTHER PUBLICATIONS

Samsung "PRB Pairs for Distributed ePDCCHs" 3GPP TSG RAN WG1 #70, R1-123484, Qingdao, China, Aug. 13-17, 2012.
LG Electronics "Details of eICIC in Macro-Pico case" 3GPP TSG RAN WG1 Meeting #62bis, R1-105352, Xian, China, Oct. 11-15, 2010.
Nokia et al. "Low load scenarios with CQI-based interference coordination" 3GPP TSG RAN WG1 Meeting #50, R1-073679, Athens, Greece, Aug. 20-24, 2007.
ZTE Corporation, "Support for quality report to Msg3 for non-anchor access in NB-Iot," 3GPP TSG-RAN2 meeting#104, R2-1817895, Spokane, United States, Nov. 12-16, 2018, 4 pages.

* cited by examiner

METHODS AND APPARATUSES FOR CHANNEL ESTIMATION

CROSS REFERENCE TO RELATED APPLICATION(S)

This application is a 35 U.S.C. § 371 National Phase Entry Application of PCT/CN2020/111867, filed Aug. 27, 2020, designating the United States, the disclosure of which is incorporated herein by reference in its entirety.

TECHNICAL FIELD

Embodiments of the disclosure generally relate to communication, and, more particularly, to methods and apparatuses for channel estimation.

BACKGROUND

This section introduces aspects that may facilitate better understanding of the present disclosure. Accordingly, the statements of this section are to be read in this light and are not to be understood as admissions about what is in the prior art or what is not in the prior art.

In narrow band Internet of things (NB-IoT), signal to interference plus noise ratios (SINRs) of narrowband (or NB-IoT) physical downlink control channel (NPDCCH) and narrowband (or NB-IoT) physical downlink shared channel (NPDSCH) may be calculated for link adaptation. In the legacy solution, both for anchor physical resource block (PRB) and non-anchor PRB, the SINRs of the NPDCCH and the NPDSCH are calculated according to a fixed formula below:

$$SINR = DLTxPsd - pathloss - IpN + DLSinrAdjust,$$

where DLTxPsd refers to transmit power spectral density (PSD) of downlink (DL) reference signal, IpN refers to interference plus noise and may be a fixed parameter, and DLSinrAdjust refers to adjustment for downlink SINR and may be a fixed parameter.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved solution for channel estimation. In particular, one of the problems to be solved by the disclosure is that the signal to interference plus noise ratio (SINR) calculated in the existing solution is not accurate leading to poor performance.

According to a first aspect of the disclosure, there is provided a method performed by a network node. The method may comprise obtaining, from a terminal device, a channel quality indication (CQI) value reported by the terminal device for an anchor physical resource block (PRB). The method may further comprise determining, for the anchor PRB, a first SINR of a downlink channel, based at least on the CQI value.

In this way, it is possible to determine a more accurate SINR by using the CQI value.

In an embodiment of the disclosure, the method may further comprise determining whether a difference between transmission powers on the anchor PRB and a non-anchor PRB is to cause the non-anchor PRB to have a different SINR than the first SINR. The method may further comprise determining, for the non-anchor PRB, a second SINR of the downlink channel, based at least on the first SINR and the determination of whether the difference between the transmission powers is to cause the non-anchor PRB to have a different SINR than the first SINR.

In an embodiment of the disclosure, determining the second SINR of the downlink channel for the non-anchor PRB may comprise, when the difference between the transmission powers is to cause the non-anchor PRB to have a different SINR than the first SINR, determining, as the second SINR, the first SINR minus the difference between the transmission powers on the anchor PRB and the non-anchor PRB.

In an embodiment of the disclosure, determining the second SINR of the downlink channel for the non-anchor PRB may comprise, when the difference between the transmission powers is not to cause the non-anchor PRB to have a different SINR than the first SINR, determining the second SINR to be equal to the first SINR.

In an embodiment of the disclosure, determining whether the difference between the transmission powers is to cause the non-anchor PRB to have a different SINR than the first SINR may comprise determining whether a power of a reference signal received by the terminal device on the anchor PRB is smaller than or equal to a sum of a thermal noise and a noise figure.

In an embodiment of the disclosure, when the power of the received reference signal is smaller than or equal to the sum, it may be determined that the difference between the transmission powers is to cause the non-anchor PRB to have a different SINR than the first SINR. When the power of the received reference signal is larger than the sum, it may be determined that the difference between the transmission powers is not to cause the non-anchor PRB to have a different SINR than the first SINR.

In an embodiment of the disclosure, determining whether the difference between the transmission powers is to cause the non-anchor PRB to have a different SINR than the first SINR may further comprise determining a pathloss between the terminal device and the network node, based on a power headroom reported by the terminal device or a reference signal received power (RSRP) measured by the network node from the terminal device. Determining whether the difference between the transmission powers is to cause the non-anchor PRB to have a different SINR than the first SINR may further comprise determining, as the power of the received reference signal, a difference between a predetermined transmission power of the reference signal and the pathloss.

In an embodiment of the disclosure, when the power headroom is larger than zero, the power headroom may be used to determine the pathloss. When the power headroom is smaller than or equal to zero, the RSRP may be used to determine the pathloss.

In an embodiment of the disclosure, the first SINR of the downlink channel may be determined based further on an adjustment parameter capable of adjusting the first SINR.

In an embodiment of the disclosure, the downlink channel may be a narrowband physical downlink control channel (NPDCCH). A predetermined repetition level corresponding to the CQI value may be adjusted by multiplying $2^n$, where n is the adjustment parameter used for NPDCCH. The adjusted repetition level may be mapped to the first SINR based on a first predetermined table indicating mapping between multiple repetition levels and multiple SINRs.

In an embodiment of the disclosure, the downlink channel may be a narrowband physical downlink shared channel (NPDSCH). A predetermined repetition level corresponding to the CQI value may be mapped to an intermediate SINR based on a second predetermined table indicating mapping between multiple repetition levels and multiple SINRs. The first SINR may be determined as a sum of the intermediate SINR and the adjustment parameter used for NPDSCH.

In an embodiment of the disclosure, the first predetermined table may be determined based on a third predetermined table indicating mapping between the multiple repetition levels and multiple SINR ranges. For each of the multiple repetition levels, the first SINR of the repetition level may satisfy following conditions: (the first SINR of the repetition level−a downward adjustment step for NPDCCH) ≤an upper limit of the SINR range of the next stronger repetition level; and (the first SINR of the repetition level+ an upward adjustment step for NPDCCH)≥a lower limit of the SINR range of the previous weaker repetition level.

In an embodiment of the disclosure, the second predetermined table may be determined based on a fourth predetermined table indicating mapping between the multiple repetition levels and multiple SINR ranges. For each of the multiple repetition levels, the first SINR of the repetition level may satisfy following condition: (the first SINR of the repetition level−a downward adjustment step for NPDSCH) ≤an upper limit of the SINR range of the next stronger repetition level.

In an embodiment of the disclosure, the method may further comprise determining one or more link adaptation parameters for the terminal device based on the first SINR and/or the second SINR. The method may further comprise transmitting the one or more link adaptation parameters to the terminal device.

According to a second aspect of the disclosure, there is provided a method performed by a terminal device. The method may comprise reporting, to a network node, a CQI value for an anchor PRB. The CQI value may be used by the network node for determining a first SINR of a downlink channel for the anchor PRB and/or a second SINR of the downlink channel for a non-anchor PRB.

In this way, it is possible to allow the network node to determine a more accurate SINR by using the CQI value.

In an embodiment of the disclosure, the method may further comprise receiving, from the network node, one or more link adaptation parameters for the anchor PRB and/or the non-anchor PRB. The method may further comprise receiving a downlink transmission from the network node based on the one or more link adaptation parameters.

According to a third aspect of the disclosure, there is provided a network node. The network node may comprise at least one processor and at least one memory. The at least one memory may contain instructions executable by the at least one processor, whereby the network node may be operative to obtain, from a terminal device, a CQI value reported by the terminal device for an anchor PRB. The network node may be further operative to determine, for the anchor PRB, a first SINR of a downlink channel, based at least on the CQI value.

In an embodiment of the disclosure, the network node may be operative to perform the method according to the above first aspect.

According to a fourth aspect of the disclosure, there is provided a terminal device. The terminal device may comprise at least one processor and at least one memory. The at least one memory may contain instructions executable by the at least one processor, whereby the terminal device may be operative to report, to a network node, a CQI value for an anchor PRB. The CQI value may be used by the network node for determining a first SINR of a downlink channel for the anchor PRB and/or a second SINR of the downlink channel for a non-anchor PRB.

In an embodiment of the disclosure, the terminal device may be operative to perform the method according to the above second aspect.

According to a fifth aspect of the disclosure, there is provided a computer program product. The computer program product may comprise instructions which when executed by at least one processor, cause the at least one processor to perform the method according to any of the above first and second aspects.

According to a sixth aspect of the disclosure, there is provided a computer readable storage medium. The computer readable storage medium may comprise instructions which when executed by at least one processor, cause the at least one processor to perform the method according to any of the above first and second aspects.

According to a seventh aspect of the disclosure, there is provided a network node. The network node may comprise an obtaining module for obtaining, from a terminal device, a CQI value reported by the terminal device for an anchor PRB. The network node may further comprise a determination module for determining, for the anchor PRB, a first SINR of a downlink channel, based at least on the CQI value.

According to an eighth aspect of the disclosure, there is provided a terminal device. The terminal device may comprise a reporting module for reporting, to a network node, a CQI value for an anchor PRB. The CQI value may be used by the network node for determining a first SINR of a downlink channel for the anchor PRB and/or a second SINR of the downlink channel for a non-anchor PRB.

According to a ninth aspect of the disclosure, there is provided a method implemented in a communication system including a terminal device and a network node. The method may comprise, at the terminal device, reporting, to the network node, a CQI value for an anchor PRB. The method may further comprise, at the network node, obtaining, from the terminal device, the CQI value reported by the terminal device for the anchor PRB. The method may further comprise, at the network node, determining, for the anchor PRB, a first SINR of a downlink channel, based at least on the CQI value.

According to a tenth aspect of the disclosure, there is provided a communication system. The communication system may comprise a terminal device and a network node. The terminal device may be configured to report, to a network node, a CQI value for an anchor PRB. The network node may be configured to obtain, from the terminal device, the CQI value reported by the terminal device for the anchor PRB, and determine, for the anchor PRB, a first SINR of a downlink channel, based at least on the CQI value.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

Figure 1:
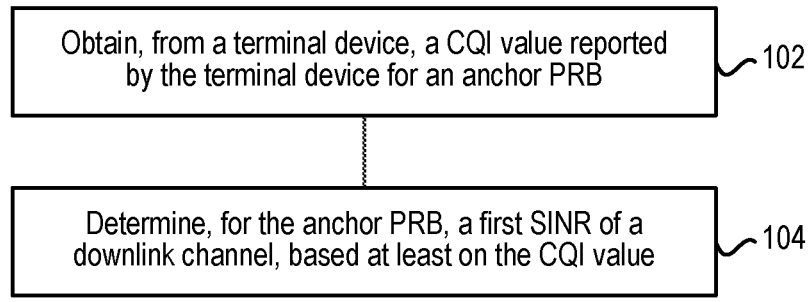
FIG. 1 is a flowchart illustrating a method performed by a network node according to an embodiment of the disclosure.
Figure 2:
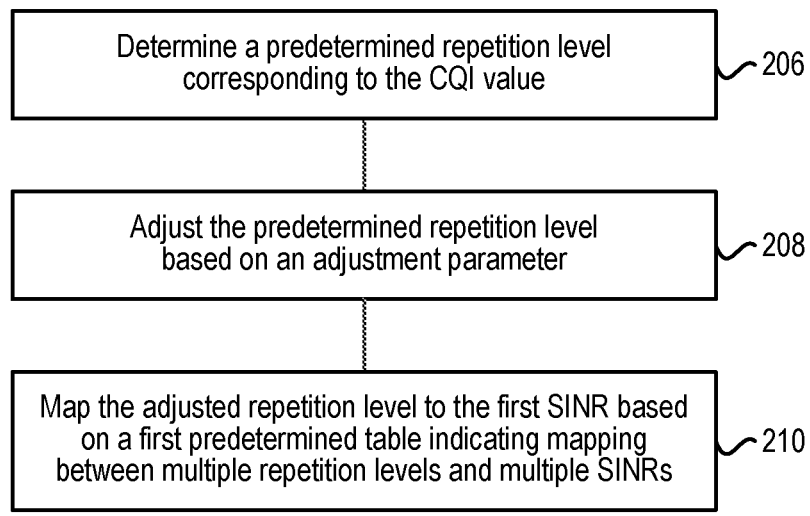
FIG. 2 is a flowchart for explaining the method of FIG. 1.
Figure 3:
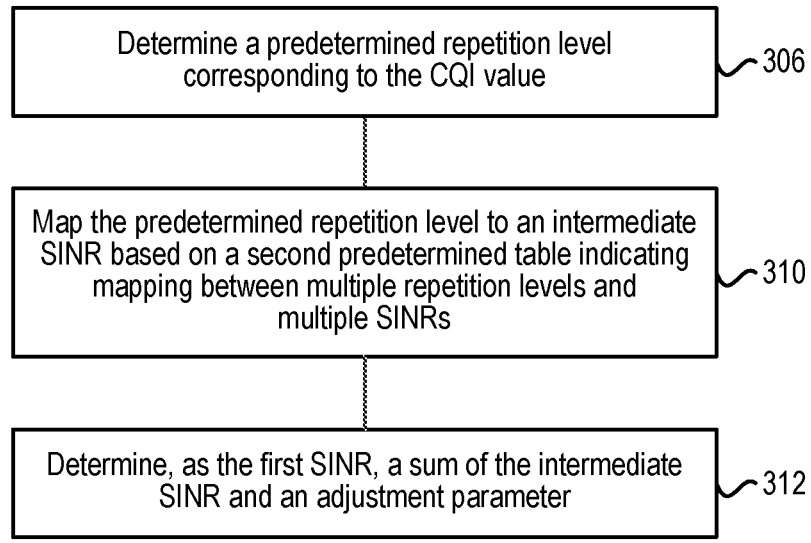
FIG. 3 is a flowchart for explaining the method of FIG. 1.

For the purpose of explanation, details are set forth in the following description in order to provide a thorough understanding of the embodiments disclosed. It is apparent, however, to those skilled in the art that the embodiments may be implemented without these specific details or with an equivalent arrangement.

In NB-IoT, channel quality indication (CQI) for anchor PRB introduced in 3rd generation partnership project (3GPP) Release 14 provides downlink channel quality and is only reported in radio resource control (RRC) idle mode. In NB-IoT, CQI unlike long term evolution (LTE) is defined as NPDCCH repetition in 3GPP. For non-anchor PRB, there is no 3GPP defined CQI for RRC connected mode.

As described above, in the legacy solution, CQI reporting was not used. According to the definition of SINR, SINR=RSRP/(I+N), where RSRP refers to reference signal received power measured by the terminal device, the parameter I refers to interference and the parameter N refers to noise. Thus, when the DL interference was stronger than the legacy SINR estimation obtained by using the fixed parameter IpN, the block error rate (BLER) resulted from the legacy SINR estimation would be higher for NPDCCH and NPDSCH. It leads to bad key performance indicator (KPI) of whole network. On the other side, when the DL interference was weaker than the legacy SINR estimation obtained by using the fixed parameter IpN, the repetition resulted from the legacy SINR estimation would be longer than enough and the resource would be wasted. It is important for narrow band (NB) because coverage enhancement 1/coverage enhancement 2 (CE1/CE2) usually have long repetitions for scheduling.

In addition, in NB-IoT, CQI unlike LTE is defined as NPDCCH repetition in 3GPP, as mentioned above. Thus, how to handle the difference of NPDCCH and NPDSCH is a key issue for link adaptation (e.g. for selecting repetition and modulation and coding scheme (MCS)).

The present disclosure proposes an improved solution for channel estimation. One of the basic ideas is to use CQI in link adaptation algorithm for selecting repetition and modulation and coding scheme (MCS) to improve the performance of NPDSCH and NPDCCH such as the convergence of BLER and the resource utilization. Another one of the basic ideas is to utilize anchor CQI to improve the performance of non-anchor in view of that the downlink channel quality is likely the same in interference limited case and the power difference of anchor and non-anchor PRB should be considered for coverage limited case. Specifically, for the coverage limited scenario, the power difference is subtracted from CQI mapped SINR. But for the interference limited scenario, CQI of anchor PRB is used directly since the value of SINR=S/(I+N) will barely change when S and I both increase for interference limited scenario.

The solution of the present disclosure may be applicable to a communication system including a terminal device and a network node such as a base station. The terminal device can communicate through a radio access communication link with the base station. The base station can provide radio access communication links to terminal devices that are within its communication service cell. Note that the communications may be performed between the terminal device and the base station according to any suitable communication standards and protocols. The terminal device may also be referred to as, for example, device, access terminal, user equipment (UE), mobile station, mobile unit, subscriber station, or the like. It may refer to any end device that can access a wireless communication network and receive services therefrom. By way of example and not limitation, the terminal device may include a portable computer, an image capture terminal device such as a digital camera, a gaming terminal device, a music storage and playback appliance, a mobile phone, a cellular phone, a smart phone, a tablet, a wearable device, a personal digital assistant (PDA), or the like.

In an Internet of things (IoT) scenario, a terminal device may represent a machine or other device that performs monitoring and/or measurements, and transmits the results of such monitoring and/or measurements to another terminal device and/or a network equipment. In this case, the terminal device may be a machine-to-machine (M2M) device, which may, in a 3GPP context, be referred to as a machine-type communication (MTC) device. Particular examples of such machines or devices may include sensors, metering devices such as power meters, industrial machineries, bikes, vehicles, or home or personal appliances, e.g. refrigerators, televisions, personal wearables such as watches, and so on.

The term "base station" may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth. A base station may comprise a central unit (CU) and one or more distributed units (DUs). The CU and DU(s) may co-locate in a same network node, e.g. a same base station.

Hereinafter, the solution of the present disclosure will be described in detail with reference to FIGS. 1-19. Although embodiments will be described in the context of NB-IoT, those skilled in the art can understand that the principle of the present disclosure can also be applicable to other suitable communication systems. FIG. 1 is a flowchart illustrating a method performed by a network node according to an embodiment of the disclosure. At block 102, the network node obtains, from a terminal device, a CQI value reported by the terminal device for an anchor PRB. For example, in NB-IoT, there is an information element (IE) called cqi-Reporting-r14 in system information block 2 for narrow band (SIB2-NB) to indicate CQI reporting for terminal device. The network node may set the IE cqi-Reporting-r14 in SIB2-NB to present. In response, the terminal device may report the CQI value (R value) in message 3 (simply referred to as msg3). For example, the reported CQI value may be contained in RRCConnectionRequest-NB or RRCConnectionReestablishmentRequest-NB. At block 104, the network node determines, for the anchor PRB, a first SINR of a downlink channel, based at least on the CQI value. Since the CQI value is used, it is possible to determine a more accurate SINR compared with the legacy solution mentioned above. As an exemplary example, layer 3 (L3) of the network node may verify whether the obtained CQI value (R value) is valid. If it is valid, L3 of the network node may send information related to the CQI value to layer 2 (L2) in ueSetupReq such that L2 can perform block 104.

As a first option, the downlink channel may be an NPDCCH in NB-IoT. For this option, block 104 may be implemented as blocks 206-210 of FIG. 2. At block 206, the network node determines a predetermined repetition level corresponding to the CQI value. For example, if the CQI value (R value) is received from RRCConnectionRequest-NB, the CQI value (R value) may be mapped to a predetermined repetition level according to the following Table 1, which is Table 9.1.22.15-1 of 3GPP TS 36.133 V16.6.0.

TABLE 1

CQI-Repetition mapping table for RRCConnectionRequest-NB

| Reported value | NPDCCH repetition level |
|---|---|
| noMeasurement | No measurement reporting |
| candidateRep-A | 1 |
| candidateRep-B | 2 |
| candidateRep-C | 4 |
| candidateRep-D | 8 |
| candidateRep-E | 16 |
| candidateRep-F | 32 |
| candidateRep-G | 64 |
| candidateRep-H | 128 |
| candidateRep-I | 256 |
| candidateRep-J | 512 |
| candidateRep-K | 1024 |
| candidateRep-L | 2048 |

If the CQI value (R value) is received from RRCConnectionReestablishmentRequest-NB, the CQI value (R value) may be mapped to a predetermined repetition level according to the following Table 2, which is Table 9.1.22.15-2 of 3GPP TS 36.133 V16.6.0.

TABLE 2

CQI-Repetition mapping table for RRCConnectionReestablishmentRequest-NB

| Reported value | NPDCCH repetition level |
|---|---|
| noMeasurements | No measurement reporting |
| candidateRep-1 | $R_{max}/8$ (NOTE 1) |
| candidateRep-2 | $R_{max}$ (NOTE 3) |
| candidateRep-3 | $4 \times R_{max}$ (NOTE 2) |

NOTE 1
When $R_{max}$ is less than 8, set candidateRep-1 to 1.
NOTE 2
When $R_{max}$ is more than 512, set candidateRep-3 to 2048.
NOTE 3
When $R_{max}$ is 1, set candidateRep-2 to 2.

At block 208, the network node adjusts the predetermined repetition level based on an adjustment parameter capable of adjusting the first SINR. For example, the predetermined repetition level may be adjusted by multiplying $2^n$, where n is the adjustment parameter used for NPDCCH and may be an integer. This can be represented as: adjusted RepetitionLevel=RepetitionLevel*($2^{\wedge}$ $NPDCCH_{factor}$). The adjustment parameter may be used in response to a trigger event indicating that the interference is stronger or weaker than estimated. For example, if the current BLER is higher than a predetermined threshold, the adjustment parameter may be used. The higher the difference between the current BLER and the predetermined threshold is, the larger the adjustment parameter is.

At block 210, the network node maps the adjusted repetition level to the first SINR based on a first predetermined table indicating mapping between multiple (predetermined) repetition levels and multiple (predetermined) SINRs. For example, the first predetermined table may be determined based on a third predetermined table indicating mapping between the multiple (predetermined) repetition levels and multiple (predetermined) SINR ranges. The mapping or correspondence between the multiple repetition levels and multiple SINR ranges may be determined by using simulation and/or actual experiments for NPDCCH. For illustration purpose, an exemplary third predetermined table may be as shown below.

TABLE 3

Mapping table between repetition levels and SINR ranges for NPDCCH

| Repetition level | SINR range |
|---|---|
| 1 | >2.2 |
| 2 | 2.2~−0.8 |
| 4 | −0.8~−3.8 |
| 8 | −3.8~−6.8 |
| 16 | −6.8~−9.8 |
| 32 | −9.8~−12.8 |
| 64 | −12.8~−15.8 |
| 128 | −15.8~−18.8 |
| 256 | −18.8~−21.8 |
| 512 | −21.8~−24.8 |
| 1024 | −24.8~−27.8 |
| 2048 | <27.8 |

In order to determine the first predetermined table, for each of the multiple repetition levels, the first SINR of the repetition level satisfies following conditions:

(the first SINR of the repetition level–a downward adjustment step for NPDCCH)≤an upper limit of the SINR range of the next stronger repetition level; and (the first SINR of the repetition level+an upward adjustment step for NPDCCH)≥a lower limit of the SINR range of the previous weaker repetition level.

With this configuration, whenever one discontinuous transmission (DTX) (which means a failure of decoding by the terminal device) arises, the next stronger repetition level can be scheduled for the terminal device. Meanwhile, whenever one non-DTX (which means a success of decoding by the terminal device) arises, the previous weaker repetition level can be scheduled for the terminal device. As a result, the convergence of link adaptation can be made faster.

For example, suppose that the downward adjustment step for NPDCCH is 3 dB and the upward adjustment step for NPDCCH is 0.33 dB. Then, for Repetition level=1, 2, 4, . . . , 2048, the above conditions can be represented as:

(the first *SINR* of Repetition level 1 − 3 dB) ≤

2.2 of [−0.8, 2.2] of Repetition level 2;

(the first *SINR* of Repetition level 2 − 3 dB) ≤

−0.8 of [−3.8, −0.8] of Repetition level 4;

(the first *SINR* of Repetition level 2 + 0.33 dB) ≥

2.2 of [2.2, ∞] of Repetition level 1;

(the first *SINR* of Repetition level 4 − 3 dB) ≤

−3.8 of [−6.8, −3.8] of Repetition level 8;

(the first *SINR* of Repetition level 4 + 0.33 dB) ≥

−0.8 of [−0.8, 2.2] of Repetition level 2;

...

(the first *SINR* of Repetition level 2048 + 0.33 dB) ≥

−27.8 of [−27.8, −24.8] of Repetition level 1024.

As an exemplar example, the first SINR of the repetition level can take the value as shown below:

the first SINR of the repetition level=the upper limit of the SINR range of the repetition level−0.2 dB.

The delta is set to −0.2 dB in order that both conditions mentioned above are valid. That means shorter time is needed to choose a short repetition or a longer repetition. The upper limit of the SINR range is selected for each repetition based on the following considerations. Firstly, the downstep for NPDCCH is 3 dB, which means there is no influence no matter which specific SINR in the SINR range is chosen, because 3 db can guarantee a stronger (or bigger) repetition will be scheduled when one DTX arises. Secondly, the upstep for NPDCCH is 0.33 dB. If the lowest SINR in the SINR range is chosen for each repetition, 9 times of non-DTX is needed to choose a weaker (or shorter) repetition. For NB-IoT, maybe lots of UEs will be released without any change. Thirdly, considering the procedure that after CQI is received, Msg4&Msg5 will be scheduled, it is better to keep the RRC signal as the same repetition for KPI, and rest data scheduling can try a shorter repetition to save resource. Fourthly, according to 3GPP, CQI repetition is defined as 1% BLER, but for link adaptation (LA), NPDCCH target BLER may be 10%. Thus, it is reasonable to choose a more aggressive repetition than UE reported for data scheduling from the view of LA. Then, the first predetermined table may be as shown below.

TABLE 4

Mapping table between repetition levels and SINRs for NPDCCH

| Repetition level | NPDCCH SINR |
|---|---|
| 1 | 3 |
| 2 | 2 |
| 4 | −1 |
| 8 | −4 |
| 16 | −7 |
| 32 | −10 |
| 64 | −13 |
| 128 | −16 |
| 256 | −19 |
| 512 | −22 |
| 1024 | −25 |
| 2048 | −28 |

Note that for Repetition level=1, the highest SINR (3 dB) for downlink control information (DCI) format1 is selected as the first SINR. This is based on the consideration that such selection allows to change to DCI format0 earlier if there is no DTX for DCI format1.

As a second option, the downlink channel may be an NPDSCH in NB-IoT. For this option, block 104 may be implemented as blocks 306-312 of FIG. 3. At block 306, the network node determines a predetermined repetition level corresponding to the CQI value. Block 306 may be the same as block 206 and its details are omitted here. At block 310, the network node maps the predetermined repetition level to an intermediate SINR based on a second predetermined table indicating mapping between multiple (predetermined) repetition levels and multiple (predetermined) SINRs.

For example, the second predetermined table may be determined based on a fourth predetermined table indicating mapping between the multiple (predetermined) repetition levels and multiple (predetermined) SINR ranges. The mapping or correspondence between the multiple repetition levels and multiple SINR ranges may be determined by using simulation and/or actual experiments for NPDSCH. For illustration purpose, an exemplary fourth predetermined table may be as shown below.

TABLE 5

Mapping table between repetition levels and SINR ranges for NPDSCH

| Repetition level | SINR range |
|---|---|
| 1 | >3.1 |
| 2 | 3.1~0.1 |
| 4 | 0.1~−2.9 |
| 8 | −2.9~−5.9 |
| 16 | −5.9~−8.9 |
| 32 | −8.9~−11.9 |
| 64 | −11.9~−14.9 |
| 128 | −14.9~−17.9 |
| 256 | −17.9~20.9 |
| 512 | −20.9~−23.9 |
| 1024 | −23.9~−26.9 |
| 2048 | <−26.9 |

In order to determine the second predetermined table, for each of the multiple repetition levels, the first SINR of the repetition level satisfies the following condition:

(the first SINR of the repetition level−a downward adjustment step for NPDSCH)≤an upper limit of the SINR range of the next stronger repetition level.

With this configuration, whenever one non-acknowledgment (NACK) or NPDSCH BLER arises, the next stronger repetition level can be scheduled for the terminal device. As a result, the convergence of link adaptation can be made faster.

For example, suppose that the downward adjustment step for NPDSCH is 1 dB and the upward adjustment step for NPDSCH is 0.1 dB. Then, for Repetition level=1, 2, 4, ..., 1024, the above condition can be represented as:

(the first SINR of Repetition level 1 − 1 dB) ≤

3.1 of [0.1, 3.1] of Repetition level 2;

(the first SINR of Repetition level 2 − 1 dB) ≤

0.1 of [−2.9, 0.1] of Repetition level 4;

(the first SINR of Repetition level 4 − 1 dB) ≤

−2.9 of [−5.9, −2.9] of Repetition level 8;

...

(the first SINR of Repetition level 1024 − 1 dB) ≤

−26.9 of [−∞, −26.9] of Repetition level 2048.

As an exemplar example, the first SINR of the repetition level can take the value as shown below:

the first SINR of the repetition level=the lower limit of the SINR range of the repetition level+0.9 dB.

The delta is set to 0.9 in order that 1 time of NACK is needed to choose a longer repetition. Then, the second predetermined table may be as shown below.

TABLE 6

Mapping table between repetition levels and SINRs for NPDSCH

| Repetition level | NPDSCH SINR |
|---|---|
| 1 | 4 |
| 2 | 1 |
| 4 | −2 |
| 8 | −5 |
| 16 | −8 |
| 32 | −11 |
| 64 | −14 |
| 128 | −17 |
| 256 | −20 |
| 512 | −23 |
| 1024 | −26 |
| 2048 | −30 |

Note that Repetition level=1 is mapped to the highest MSC (=13). This is based on the consideration that if Repetition level=1 is not mapped to the highest MSC, this highest MCS can hardly be selected any more due to link adaptation step.

At block 312, the network node determines, as the first SINR, a sum of the intermediate SINR and an adjustment parameter used for NPDSCH. Similar to the adjustment parameter used for NPDCCH, The adjustment parameter used for NPDSCH may be used in response to a trigger event indicating that the interference is stronger or weaker than estimated. For example, if the current BLER is higher than a predetermined threshold, the adjustment parameter may be used. The higher the difference between the current BLER and the predetermined threshold is, the smaller the adjustment parameter (a negative value in this case) is. Although the adjustment parameters used for NPDCCH and NPDSCH adjust their corresponding first SINRs in different manners in the above examples, it is also possible that the adjustment manner for one of the two downlink channels may be used for the other downlink channel, or both adjustment manners may be used in combination for the same downlink channel.

Figure 4:
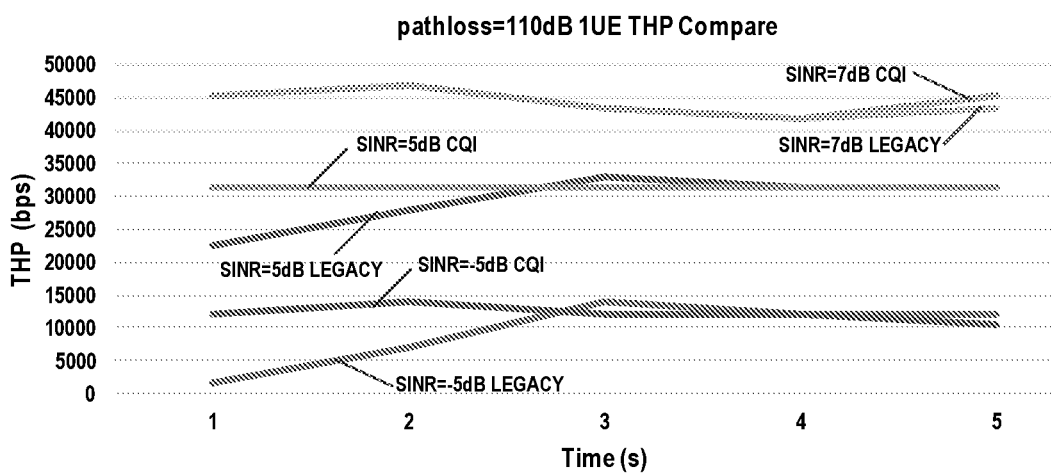
FIG. 4 is a diagram illustrating a comparison between the solution according to an embodiment and the legacy solution.

FIG. 4 is a diagram illustrating simulation results of a comparison between the solution according to an embodiment and the legacy solution. In the simulation, the pathloss is assumed to be 110 dB. In the solution according to the embodiment, Table 1, Table 2, Table 4 and Table 6 are used for mapping the CQI value to the first SINR. As shown in FIG. 4, when SINR=−5 dB which means the interference is strong, the convergence of the embodiment is faster than the legacy solution. When SINR=5 dB which means the interference is smaller, the difference of convergence is smaller between the embodiment and the legacy solution. When SINR=7 dB, the embodiment and the legacy solution have basically the same convergence. Therefore, it can be concluded that the stronger the interference is, the more significant the gain is.

Figure 5:
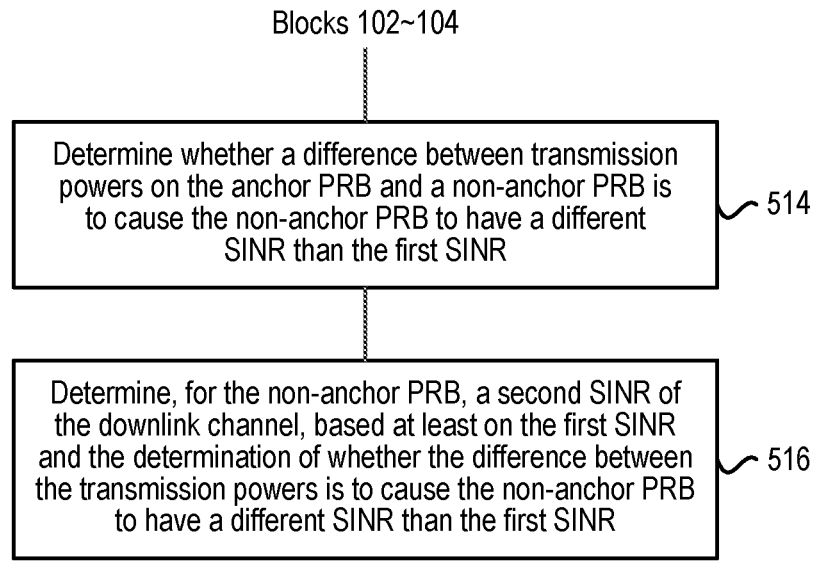
FIG. 5 is a flowchart illustrating a method performed by a network node according to an embodiment of the disclosure.
Figure 6:
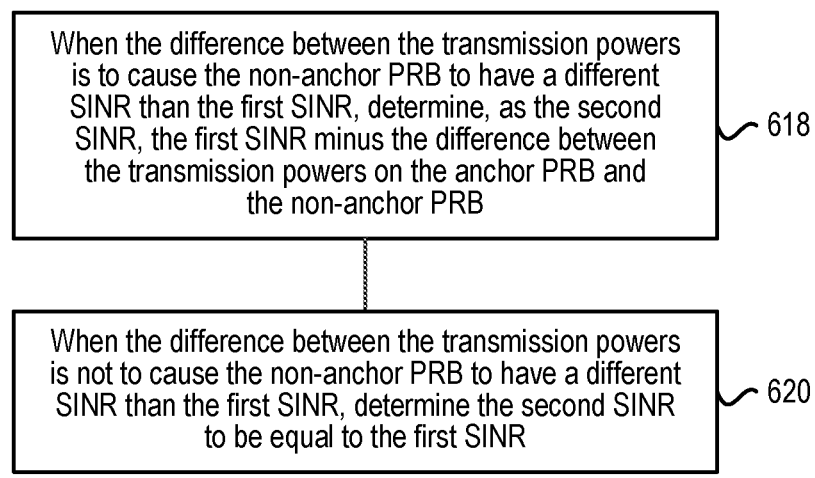
FIG. 6 is a flowchart for explaining the method of FIG. 5.
Figure 7:
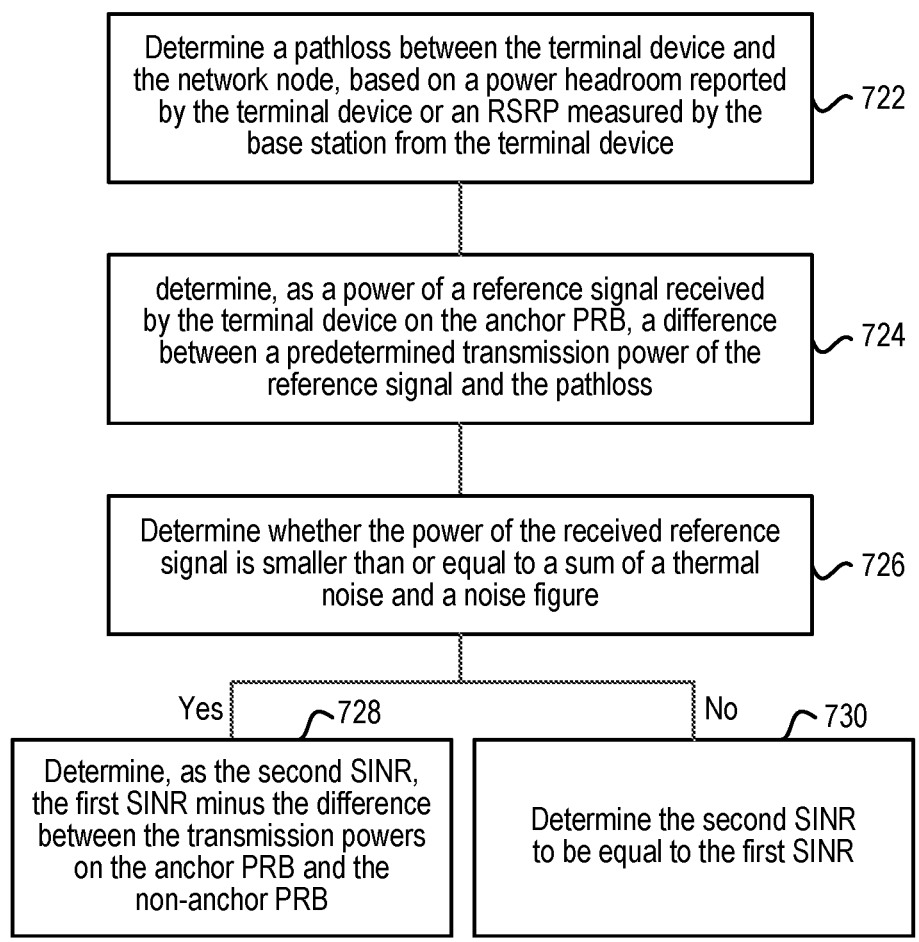
FIG. 7 is a flowchart for explaining the method of FIG. 5.

FIG. 5 is a flowchart illustrating a method performed by a network node according to an embodiment of the disclosure. As shown, the method comprises blocks 102-104 and 514-516. Blocks 102-104 have been described above and their details are omitted here. At block 514, the network node determines whether a difference between transmission powers on the anchor PRB and a non-anchor PRB is to cause the non-anchor PRB to have a different SINR than the first SINR. Note that the PRB in singular form in anchor PRB/non-anchor PRB may cover one or more PRBs. For example, block 514 may be implemented as blocks 722-726 of FIG. 7.

At block 722, the network node determines a pathloss between the terminal device and the network node, based on a power headroom (PH) reported by the terminal device or an RSRP measured by the network node from the terminal device. For example, the PH may be reported by the terminal device in msg3. As defined in section 16.2.1.1.2 of 3GPP TS 36.213 V16.2.0, if the UE transmits narrow band (or NB-IoT) physical uplink shared channel (NPUSCH) in NB-IoT uplink (UL) slot i for serving cell c, power headroom $PH_c(i)$ is computed using:

$$PH_c(i)=P_{CMAX,c}(i)-\{P_{O\_NPUSCH,c}(1)+\alpha_c(1) \cdot PL_c\} \text{ [dB]},$$

where $P_{CMAX,c}(i)$ is the configured UE transmit power defined in 3GPP TS 36.101 in NB-IoT UL slot i for serving cell c; $P_{O\_NPUSCH,c}(j)$ is a parameter composed of the sum of a component $P_{O\_NOMINAL\_NPUSCH,c}(j)$ provided from higher layers and a component $P_{O\_UE\_NPUSCH,c}(j)$ provided by higher layers for j=1, 3 and for serving cell c where j∈{1,2,3}; For j=1, for NPUSCH format 2, $\alpha_c(j)=1$; for NPUSCH format 1, $\alpha_c(j)$ is provided by higher layers for serving cell c; $PL_c$ is the downlink path loss estimate calculated in the UE for serving cell c in dB.

Thus, when the PH is larger than zero, the PH may be used to determine the pathloss according to the above formula. As an exemplary example, with Power Class 3, the typical configuration for NB system is as follows: $P_{CMAX,c}(i)=23$ dbm, $P_{O\_NPUSCH,c}(1)=-100\sim-110$ dbm, $\alpha_c(1)=1$. Then, $PL_c=P_{CMAX,c}(i)-P_{O\_NPUSCH,c}(1)-PH_c(i)=23-(-100\sim-110)$ dB−$PH_c(i)=123\sim133$ dB−$PH_c(i)$. Thus, when PHR>0, it means the pathloss is less than 133 dB.

On the other hand, when the PH is smaller than or equal to zero, the RSRP measured by the network node (e.g. in msg3) from the terminal device may be used to determine the pathloss. Since the terminal device uses $P_{CMAX,c}(i)$ in this case, the pathloss PL can be represented as: PL= $P_{CMAX,c}(i)$−the RSRP=23 dB−the RSRP.

At block 724, the network node determines, as a power of a reference signal received by the terminal device on the anchor PRB, a difference between a predetermined transmission power of the reference signal and the pathloss. As an exemplary example, for standalone (SA) configured by NB cells, the predetermined transmission power of the reference signal is 32 dbm. Then, for PH>0, the reference signal (RS) power received by the terminal device=RS power−PL=32 dbm−133 dbm+$PH_c(i)$=−101 dbm+$PH_c(i)$. For PH≤0, the reference signal (RS) power received by the terminal device=RS power−PL=32 dbm−$P_{CMAX,c}(i)$+the RSRP=9 dB+the RSRP.

At block 726, the network node determines whether the power of the reference signal received by the terminal device on the anchor PRB is smaller than or equal to a sum of a thermal noise and a noise figure. If the power of the received reference signal is smaller than or equal to the sum, the network node may determine that the difference between the transmission powers is to cause the non-anchor PRB to have a different SINR than the first SINR. This scenario may also be referred to as coverage limited scenario since coverage will take main effect on CQI.

On the other hand, if the power of the received reference signal is larger than the sum, the network node may determine that the difference between the transmission powers is not to cause the non-anchor PRB to have a different SINR than the first SINR. This scenario may also be referred to as interference limited scenario since the value of SINR=S/(I+N) will hardly change when S and I both increase for interference limited scenario.

As an exemplary example, in typical cases, the sum of the thermal noise and the noise figure is −123 dbm. Thus, for PH>0, the RS power received by the terminal device (−101 dbm+$PH_c(i)$) is much higher than the sum (−123 dbm). It can be inferred that when PH>0, it is the interference limited scenario as the power difference will not influence CQI. For PH≤0, the relationship between the RS power received by the terminal device and the sum depends on the RSRP.

Referring back to FIG. 5, at block 516, the network node determines, for the non-anchor PRB, a second SINR of the downlink channel, based at least on the first SINR and the determination of whether the difference between the transmission powers is to cause the non-anchor PRB to have a different SINR than the first SINR. For example, block 516 may be implemented as blocks 618-620 of FIG. 6.

At block 618, when the difference between the transmission powers is to cause the non-anchor PRB to have a different SINR than the first SINR, the network node determines, as the second SINR, the first SINR minus the difference between the transmission powers on the anchor PRB and the non-anchor PRB. Block 618 corresponds to block 728 of FIG. 7. At block 728, when the power of the received reference signal is smaller than or equal to the sum, the network node determines, as the second SINR, the first SINR minus the difference between the transmission powers on the anchor PRB and the non-anchor PRB.

At block 620, when the difference between the transmission powers is not to cause the non-anchor PRB to have a different SINR than the first SINR, the network node determines the second SINR to be equal to the first SINR. Block 620 corresponds to block 730 of FIG. 7. At block 730, when the power of the received reference signal is larger than the sum, the network node determines the second SINR to be equal to the first SINR.

With the method of FIG. 5, although there is no 3GPP defined CQI for RRC connected mode for non-anchor PRB, the CQI value for the anchor PRB can be utilized to determine a more accurate SINR for the non-anchor PRB compared with the legacy solution.

Figure 8:
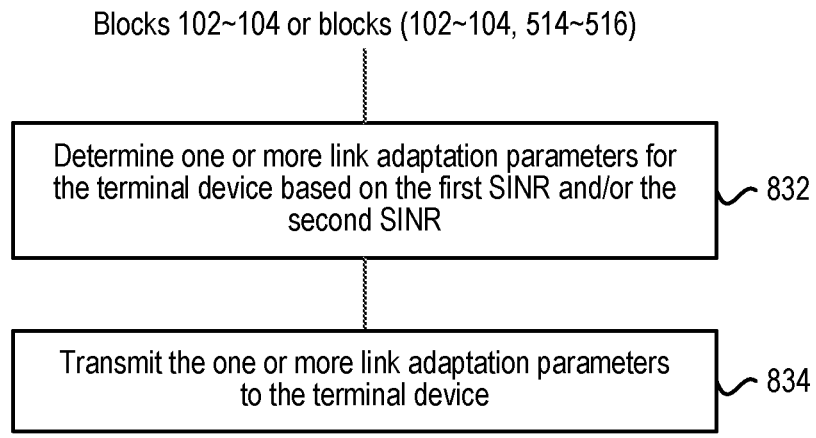
FIG. 8 is a flowchart illustrating a method performed by a network node according to an embodiment of the disclosure.

FIG. 8 is a flowchart illustrating a method performed by a network node according to an embodiment of the disclosure. As shown, as a first option, the method may comprise blocks 102-104 and 832-834. As a second option, the method may comprise blocks 102-104, 514-516 and 832-834. Blocks 102-104 and 514-516 have been described above and their details are omitted here. At block 832, the network node determines one or more link adaptation parameters for the terminal device based on the first SINR and/or the second SINR. For the above first option, the one or more link adaptation parameters (e.g. repetition, MCS, number of subframe (NSF), etc.) may be determined based on the first SINR. For the above second option, the one or more link adaptation parameters (e.g. repetition, MCS, etc.) may be determined based on the first SINR and/or the second SINR. At block 834, the network node transmits the one or more link adaptation parameters to the terminal device. With the method of FIG. 8, since the first SINR and/or the second SINR determined based on the CQI value is used for link adaptation, the performance of the link adaptation can be improved.

Figure 9:
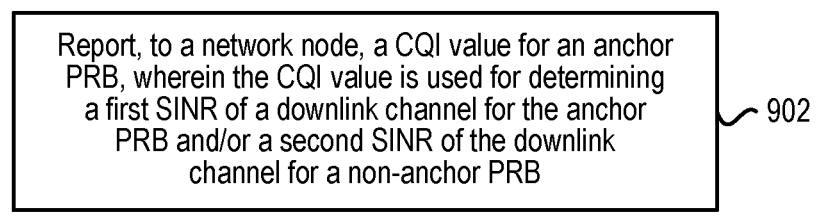
FIG. 9 is a flowchart illustrating a method performed by a terminal device according to an embodiment of the disclosure.

FIG. 9 is a flowchart illustrating a method performed by a terminal device according to an embodiment of the disclosure. At block 902, the terminal device reports, to a network node, a CQI value for an anchor PRB. The CQI value is used for determining a first SINR of a downlink channel for the anchor PRB and/or a second SINR of the downlink channel for a non-anchor PRB. With the method of FIG. 9, it is possible to allow the network node to determine a more accurate SINR by using the CQI value.

Figure 10:
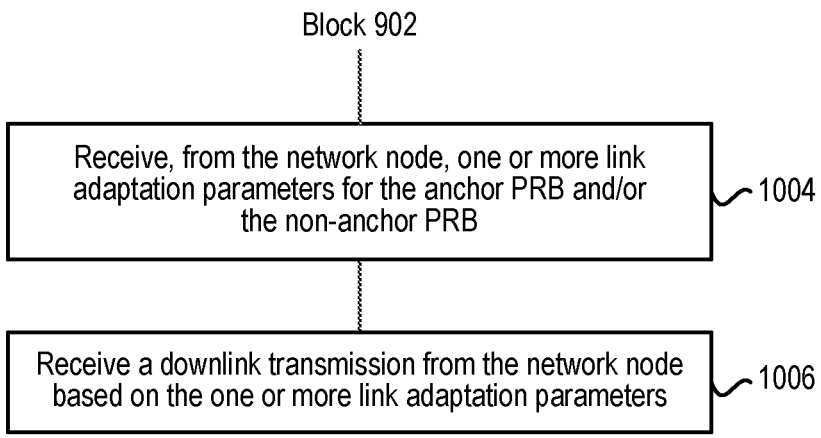
FIG. 10 is a flowchart illustrating a method performed by a terminal device according to an embodiment of the disclosure.

FIG. 10 is a flowchart illustrating a method performed by a terminal device according to an embodiment of the disclosure. As shown, the method comprises block 902 described above and blocks 1004-1006. At block 1004, the terminal device receives, from the network node, one or more link adaptation parameters for the anchor PRB and/or the non-anchor PRB. At block 1 the terminal device receives a downlink transmission from the network node based on the one or more link adaptation parameters. With the method of FIG. 10, the reception of the downlink transmission can be improved since the link adaptation parameters are derived from the CQI value.

Figure 11:
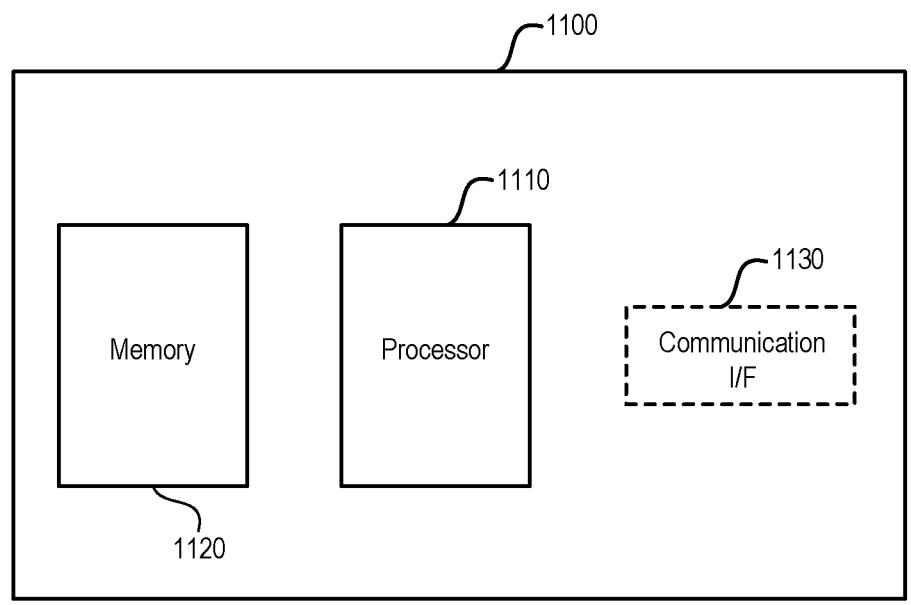
FIG. 11 is a block diagram showing an apparatus suitable for use in practicing some embodiments of the disclosure.

FIG. 11 is a block diagram showing an apparatus suitable for use in practicing some embodiments of the disclosure. For example, any one of the first terminal device, the second terminal device and the base station described above may be implemented through the apparatus 1100. As shown, the apparatus 1100 may include a processor 1100, a memory 1120 that stores a program, and optionally a communication interface 1130 for communicating data with other external devices through wired and/or wireless communication.

The program includes program instructions that, when executed by the processor 1110, enable the apparatus 1110 to operate in accordance with the embodiments of the present disclosure, as discussed above. That is, the embodiments of the present disclosure may be implemented at least in part by computer software executable by the processor 1110, or by hardware, or by a combination of software and hardware.

The memory 1120 may be of any type suitable to the local technical environment and may be implemented using any suitable data storage technology, such as semiconductor based memory devices, flash memories, magnetic memory devices and systems, optical memory devices and systems, fixed memories and removable memories. The processor 1110 may be of any type suitable to the local technical environment, and may include one or more of general purpose computers, special purpose computers, microprocessors, digital signal processors (DSPs) and processors based on multi-core processor architectures, as non-limiting examples.

Figure 12:
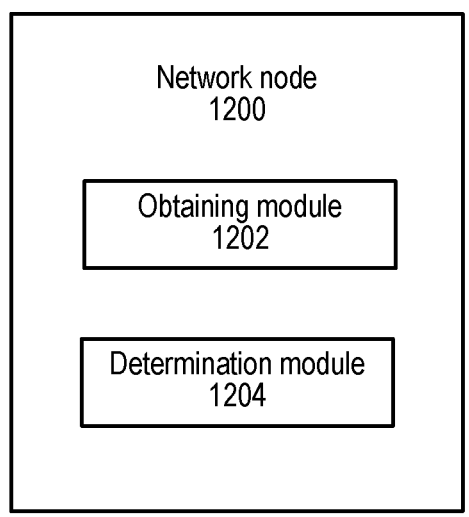
FIG. 12 is a block diagram showing a network node according to an embodiment of the disclosure.

FIG. 12 is a block diagram showing a network node according to an embodiment of the disclosure. As shown, the network node 1200 comprises an obtaining module 1202 and a determination module 1204. The obtaining module 1202 may be configured to obtain, from a terminal device, a CQI value reported by the terminal device for an anchor PRB, as described above with respect to block 102. The determination module 1204 may be configured to determine, for the anchor PRB, a first SINR of a downlink channel, based at least on the CQI value, as described above with respect to block 104.

Figure 13:
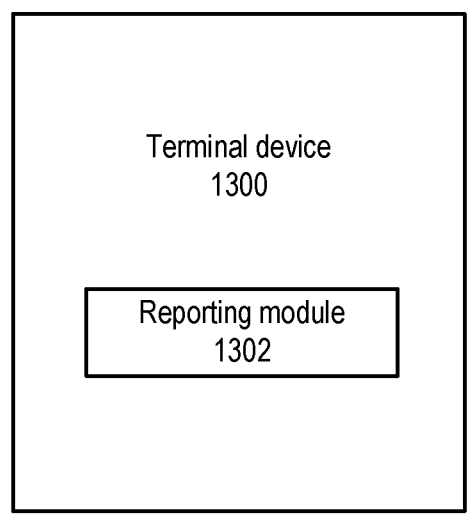
FIG. 13 is a block diagram showing a terminal device according to an embodiment of the disclosure.

FIG. 13 is a block diagram showing a terminal device according to an embodiment of the disclosure. As shown, the terminal device 1300 comprises a reporting module 1302. The reporting module 1302 may be configured to report, to a network node, a CQI value for an anchor PRB, as described above with respect to block 902. The CQI value may be used by the network node for determining a first SINR of a downlink channel for the anchor PRB and/or a second SINR of the downlink channel for a non-anchor PRB. The modules described above may be implemented by hardware, or software, or a combination of both.

Figure 14:
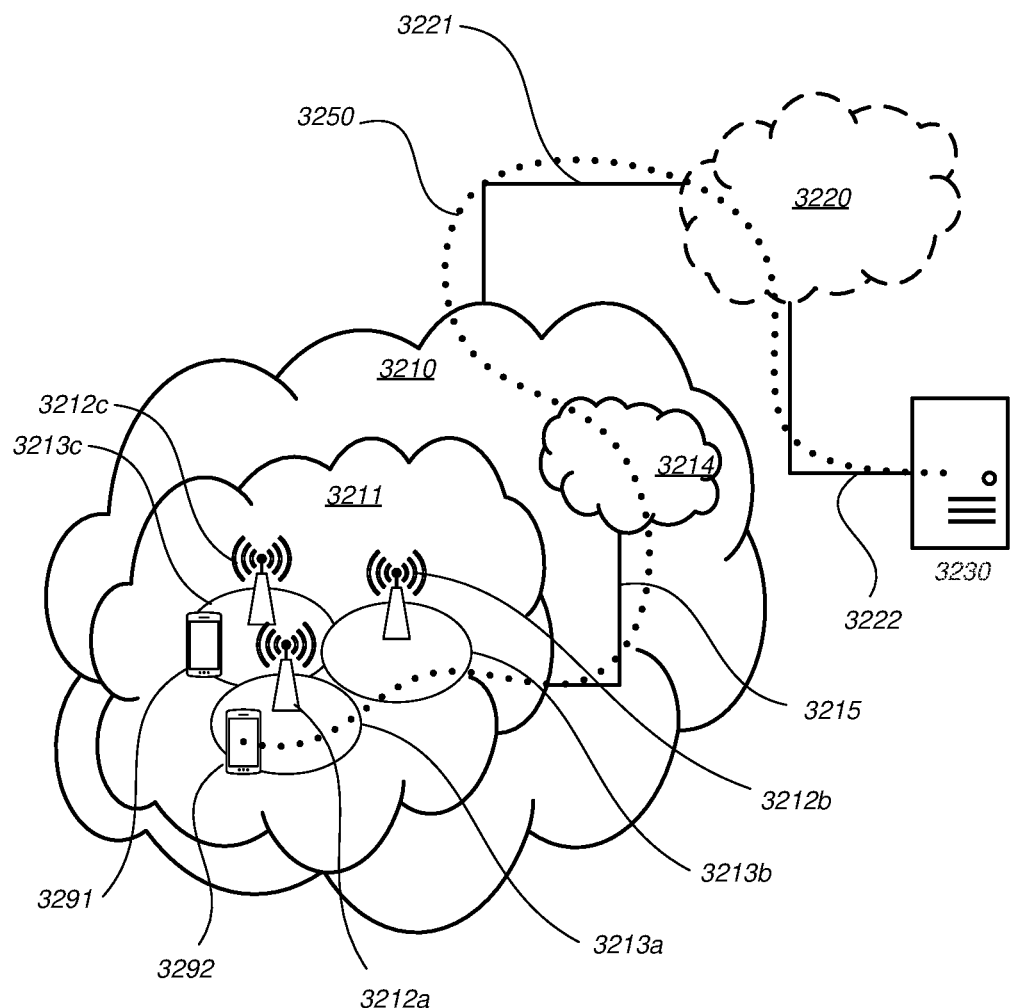
FIG. 14 is a diagram showing a telecommunication network connected via an intermediate network to a host computer in accordance with some embodiments.

With reference to FIG. 14, in accordance with an embodiment, a communication system includes telecommunication network 3210, such as a 3GPP-type cellular network, which comprises access network 3211, such as a radio access network, and core network 3214. Access network 3211 comprises a plurality of base stations 3212a, 3212b, 3212c, such as NBs, eNBs, gNBs or other types of wireless access points, each defining a corresponding coverage area 3213a, 3213b, 3213c. Each base station 3212a, 3212b, 3212c is connectable to core network 3214 over a wired or wireless connection 3215. A first UE 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

Telecommunication network 3210 is itself connected to host computer 3230, which may be embodied in the hardware and/or software of a standalone server, a cloud-implemented server, a distributed server or as processing resources in a server farm. Host computer 3230 may be under the ownership or control of a service provider, or may be operated by the service provider or on behalf of the service provider. Connections 3221 and 3222 between telecommunication network 3210 and host computer 3230 may extend directly from core network 3214 to host computer 3230 or may go via an optional intermediate network 3220. Intermediate network 3220 may be one of, or a combination of more than one of, a public, private or hosted network; intermediate network 3220, if any, may be a backbone network or the Internet; in particular, intermediate network 3220 may comprise two or more sub-networks (not shown).

The communication system of FIG. 14 as a whole enables connectivity between the connected UEs 3291, 3292 and host computer 3230. The connectivity may be described as an over-the-top (OTT) connection 3250. Host computer 3230 and the connected UEs 3291, 3292 are configured to communicate data and/or signaling via OTT connection 3250, using access network 3211, core network 3214, any intermediate network 3220 and possible further infrastructure (not shown) as intermediaries. OTT connection 3250 may be transparent in the sense that the participating communication devices through which OTT connection 3250 passes are unaware of routing of uplink and downlink communications. For example, base station 3212 may not or need not be informed about the past routing of an incoming downlink communication with data originating from host computer 3230 to be forwarded (e.g., handed over) to a connected UE 3291. Similarly, base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 15. In communication system 3300, host computer 3310 comprises hardware 3315 including communication interface 3316 configured to set up and maintain a wired or wireless connection with an interface of a different communication device of communication system 3300. Host computer 3310 further comprises processing circuitry 3318, which may have storage and/or processing capabilities. In particular, processing circuitry 3318 may comprise one or more programmable processors, application-specific integrated circuits, field programmable gate arrays or combinations of these (not shown) adapted to execute instructions. Host computer 3310 further comprises software 3311, which is stored in or accessible by host computer 3310 and executable by processing circuitry 3318. Software 3311 includes host application 3312. Host application 3312 may be operable to provide a service to a remote user, such as UE 3330 connecting via OTT connection 3350 terminating at UE 3330 and host computer 3310. In providing the service to the remote user, host application 3312 may provide user data which is transmitted using OTT connection 3350.

Communication system 3300 further includes base station 3320 provided in a telecommunication system and comprising hardware 3325 enabling it to communicate with host computer 3310 and with UE 3330. Hardware 3325 may include communication interface 3326 for setting up and maintaining a wired or wireless connection with an interface of a different communication device of communication system 3300, as well as radio interface 3327 for setting up and maintaining at least wireless connection 3370 with UE 3330 located in a coverage area (not shown in FIG. 15) served by base station 3320. Communication interface 3326 may be configured to facilitate connection 3360 to host computer 3310. Connection 3360 may be direct or it may pass through a core network (not shown in FIG. 15) of the telecommunication system and/or through one or more intermediate networks outside the telecommunication system. In the embodiment shown, hardware 3325 of base station 3320 further includes processing circuitry 3328, which may comprise one or more programmable processors, application-specific integrated circuits, field programmable gate arrays or combinations of these (not shown) adapted to execute instructions. Base station 3320 further has software 3321 stored internally or accessible via an external connection.

Communication system 3300 further includes UE 3330 already referred to. Its hardware 3335 may include radio interface 3337 configured to set up and maintain wireless connection 3370 with a base station serving a coverage area in which UE 3330 is currently located. Hardware 3335 of UE 3330 further includes processing circuitry 3338, which may comprise one or more programmable processors, application-specific integrated circuits, field programmable gate arrays or combinations of these (not shown) adapted to execute instructions. UE 3330 further comprises software 3331, which is stored in or accessible by UE 3330 and executable by processing circuitry 3338. Software 3331 includes client application 3332. Client application 3332 may be operable to provide a service to a human or non-human user via UE 3330, with the support of host computer 3310. In host computer 3310, an executing host application 3312 may communicate with the executing client application 3332 via OTT connection 3350 terminating at UE 3330 and host computer 3310. In providing the service to the user, client application 3332 may receive request data from host application 3312 and provide user data in response to the request data. OTT connection 3350 may transfer both the request data and the user data. Client application 3332 may interact with the user to generate the user data that it provides.

Figure 15:
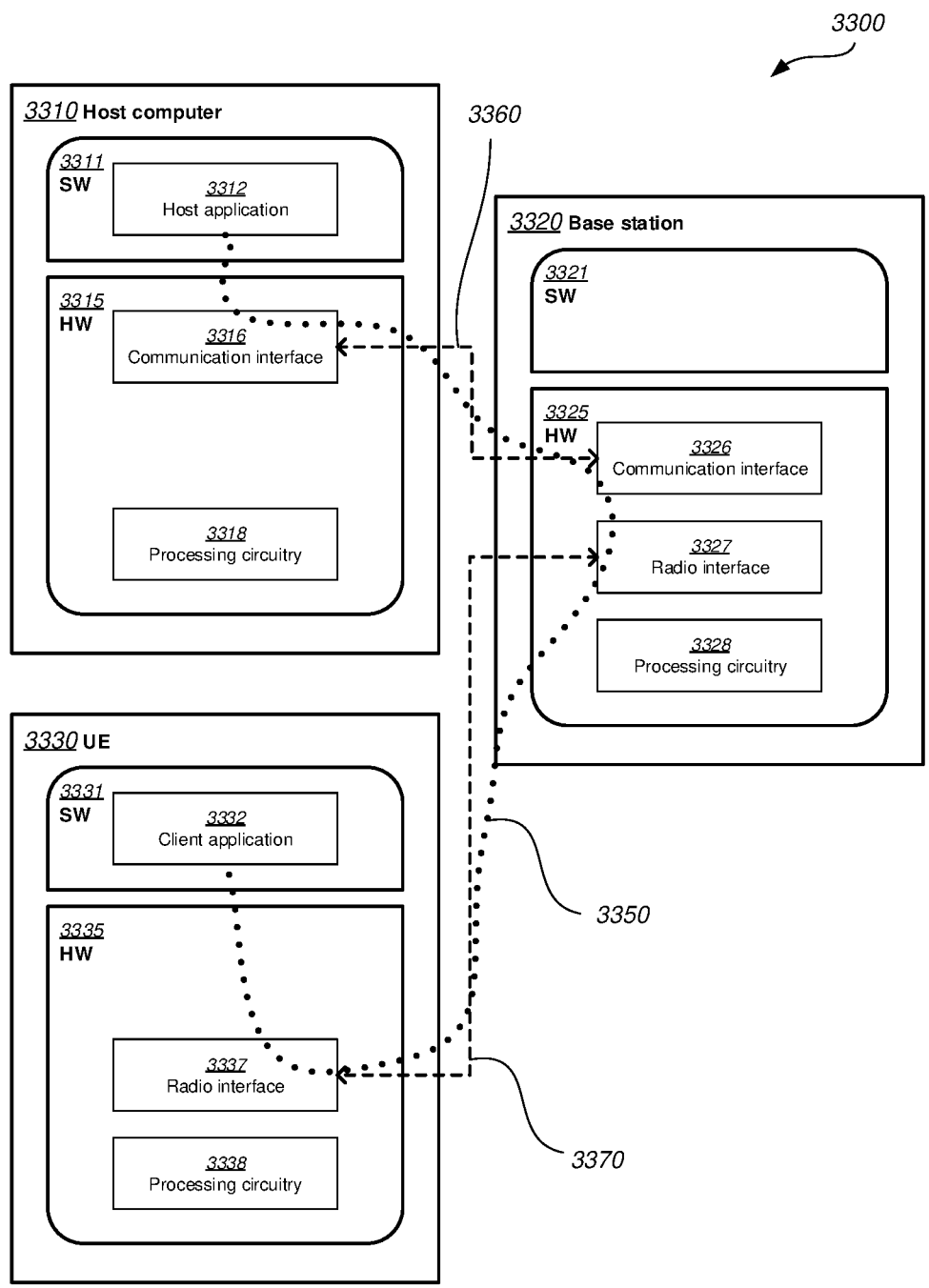
FIG. 15 is a diagram showing a host computer communicating via a base station with a user equipment in accordance with some embodiments.

It is noted that host computer 3310, base station 3320 and UE 3330 illustrated in FIG. 15 may be similar or identical to host computer 3230, one of base stations 3212*a*, 3212*b*, 3212*c* and one of UEs 3291, 3292 of FIG. 14, respectively. This is to say, the inner workings of these entities may be as shown in FIG. 15 and independently, the surrounding network topology may be that of FIG. 14.

In FIG. 15, OTT connection 3350 has been drawn abstractly to illustrate the communication between host computer 3310 and UE 3330 via base station 3320, without explicit reference to any intermediary devices and the precise routing of messages via these devices. Network infrastructure may determine the routing, which it may be configured to hide from UE 3330 or from the service provider operating host computer 3310, or both. While OTT connection 3350 is active, the network infrastructure may further take decisions by which it dynamically changes the routing (e.g., on the basis of load balancing consideration or reconfiguration of the network).

Wireless connection 3370 between UE 3330 and base station 3320 is in accordance with the teachings of the embodiments described throughout this disclosure. One or more of the various embodiments improve the performance of OTT services provided to UE 3330 using OTT connection 3350, in which wireless connection 3370 forms the last segment. More precisely, the teachings of these embodiments may improve the latency and thereby provide benefits such as reduced user waiting time.

A measurement procedure may be provided for the purpose of monitoring data rate, latency and other factors on which the one or more embodiments improve. There may further be an optional network functionality for reconfiguring OTT connection 3350 between host computer 3310 and UE 3330, in response to variations in the measurement results. The measurement procedure and/or the network functionality for reconfiguring OTT connection 3350 may be implemented in software 3311 and hardware 3315 of host computer 3310 or in software 3331 and hardware 3335 of UE 3330, or both. In embodiments, sensors (not shown) may be deployed in or in association with communication devices through which OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of OTT connection 3350 may include message format, retransmission settings, preferred routing etc.; the reconfiguring need not affect base station 3320, and it may be unknown or imperceptible to base station 3320. Such procedures and functionalities may be known and practiced in the art. In certain embodiments, measurements may involve proprietary UE signaling facilitating host computer 3310's measurements of throughput, propagation times, latency and the like. The measurements may be implemented in that software 3311 and 3331 causes messages to be transmitted, in particular empty or 'dummy' messages, using OTT connection 3350 while it monitors propagation times, errors etc.

Figure 16:
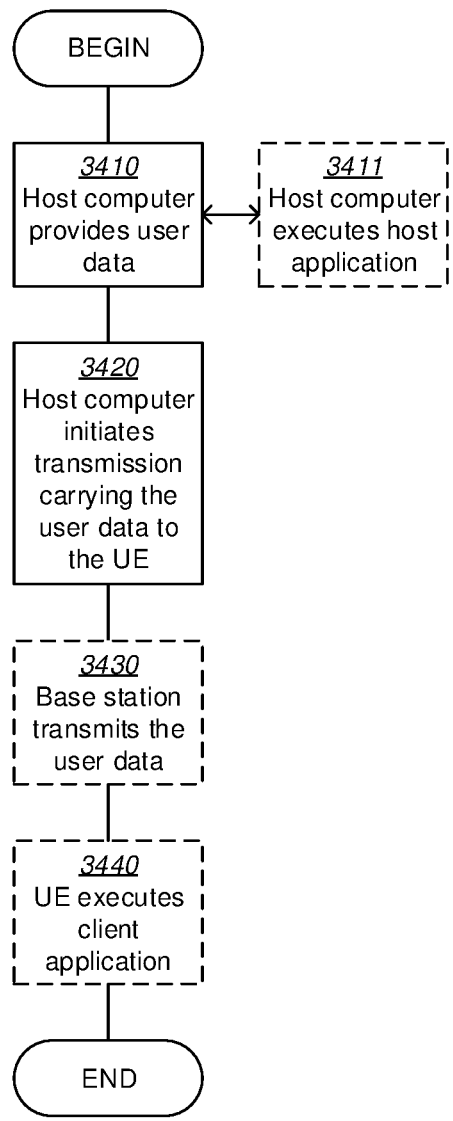
FIG. 16 is a flowchart illustrating a method implemented in a communication system in accordance with some embodiments.

FIG. 16 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section. In step 3410, the host computer provides user data. In substep 3411 (which may be optional) of step 3410, the host computer provides the user data by executing a host application. In step 3420, the host computer initiates a transmission carrying the user data to the UE. In step 3430 (which may be optional), the base station transmits to the UE the user data which was carried in the transmission that the host computer initiated, in accordance with the teachings of the embodiments described throughout this disclosure. In step 3440 (which may also be optional), the UE executes a client application associated with the host application executed by the host computer.

Figure 17:
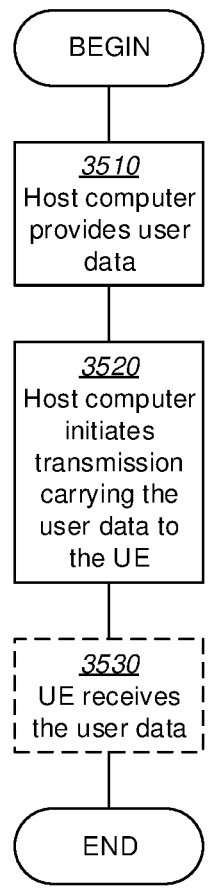
FIG. 17 is a flowchart illustrating a method implemented in a communication system in accordance with some embodiments.

FIG. 17 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section. In step 3510 of the method, the host computer provides user data. In an optional substep (not shown) the host computer provides the user data by executing a host application. In step 3520, the host computer initiates a transmission carrying the user data to the UE. The transmission may pass via the base station, in accordance with the teachings of the embodiments described throughout this disclosure. In step 3530 (which may be optional), the UE receives the user data carried in the transmission.

Figure 18:
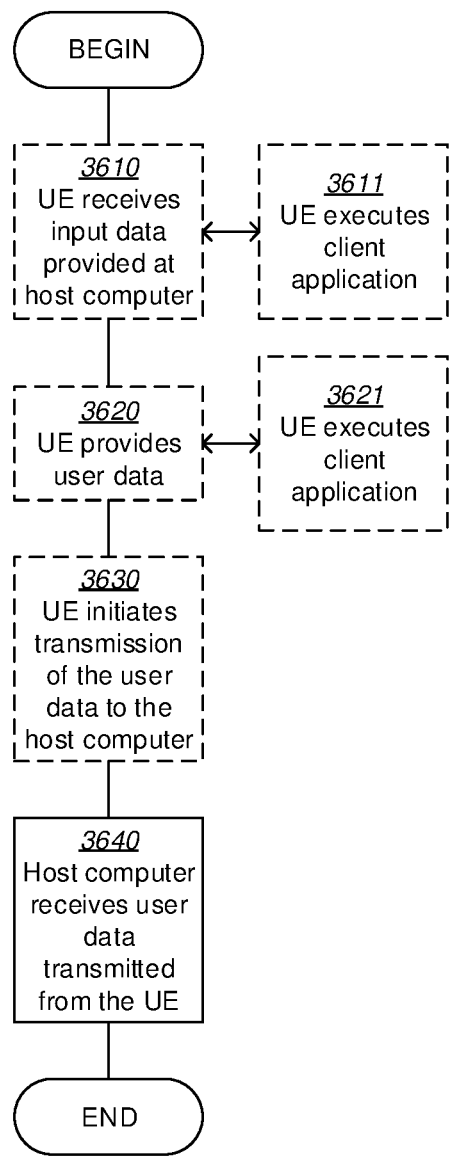
FIG. 18 is a flowchart illustrating a method implemented in a communication system in accordance with some embodiments.

FIG. 18 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 18 will be included in this section. In step 3610 (which may be optional), the UE receives input data provided by the host computer. Additionally or alternatively, in step 3620, the UE provides user data. In substep 3621 (which may be optional) of step 3620, the UE provides the user data by executing a client application. In substep 3611 (which may be optional) of step 3610, the UE executes a client application which provides the user data in reaction to the received input data provided by the host computer. In providing the user data, the executed client application may further consider user input received from the user. Regardless of the specific manner in which the user data was provided, the UE initiates, in substep 3630 (which may be optional), transmission of the user data to the host computer. In step 3640 of the method, the host computer receives the user data transmitted from the UE, in accordance with the teachings of the embodiments described throughout this disclosure.

Figure 19:
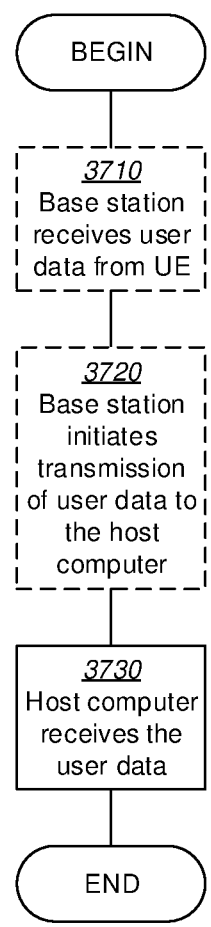
FIG. 19 is a flowchart illustrating a method implemented in a communication system in accordance with some embodiments.

FIG. 19 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 19 will be included in this section. In step 3710 (which may be optional), in accordance with the teachings of the embodiments described throughout this disclosure, the base station receives user data from the UE. In step 3720 (which may be optional), the base station initiates transmission of the received user data to the host computer. In step 3730 (which may be optional), the host computer receives the user data carried in the transmission initiated by the base station.

According to an aspect of the disclosure, there is provided a method implemented in a communication system including a host computer, a base station and a terminal device. The method may comprise, at the host computer, providing user data. The method may further comprise, at the host computer, initiating a transmission carrying the user data to the terminal device via a cellular network comprising the base station. The base station may obtain, from a terminal device, a CQI value reported by the terminal device for an anchor PRB. The base station may determine, for the anchor PRB, a first SINR of a downlink channel, based at least on the CQI value.

In an embodiment of the disclosure, the method may further comprise, at the base station, transmitting the user data.

In an embodiment of the disclosure, the user data may be provided at the host computer by executing a host application. The method may further comprise, at the terminal device, executing a client application associated with the host application.

According to another aspect of the disclosure, there is provided a communication system including a host computer comprising processing circuitry configured to provide user data and a communication interface configured to forward the user data to a cellular network for transmission to a terminal device. The cellular network may comprise a base station having a radio interface and processing circuitry. The base station's processing circuitry may be configured to obtain, from a terminal device, a CQI value reported by the terminal device for an anchor PRB. The base station's processing circuitry may be further configured to determine, for the anchor PRB, a first SINR of a downlink channel, based at least on the CQI value.

In an embodiment of the disclosure, the communication system may further include the base station.

In an embodiment of the disclosure, the communication system may further include the terminal device. The terminal device may be configured to communicate with the base station.

In an embodiment of the disclosure, the processing circuitry of the host computer may be configured to execute a host application, thereby providing the user data. The terminal device may comprise processing circuitry configured to execute a client application associated with the host application.

According to yet another aspect of the disclosure, there is provided a method implemented in a communication system including a host computer, a base station and a terminal device. The method may comprise, at the host computer, providing user data. The method may further comprise, at the host computer, initiating a transmission carrying the user data to the terminal device via a cellular network comprising the base station. The terminal device may report, to a network node, a CQI value for an anchor PRB. The CQI value is used for determining a first SINR of a downlink channel for the anchor PRB and/or a second SINR of the downlink channel for a non-anchor PRB.

In an embodiment of the disclosure, the method may further comprise, at the terminal device, receiving the user data from the base station.

According to yet another aspect of the disclosure, there is provided a communication system including a host computer comprising processing circuitry configured to provide user data and a communication interface configured to forward user data to a cellular network for transmission to a terminal device. The terminal device may comprise a radio interface and processing circuitry. The processing circuitry of the terminal device may be configured to report, to a network node, a CQI value for an anchor PRB. The CQI value is used for determining a first SINR of a downlink channel for the anchor PRB and/or a second SINR of the downlink channel for a non-anchor PRB.

In an embodiment of the disclosure, the communication system may further include the terminal device.

In an embodiment of the disclosure, the cellular network may further include a base station configured to communicate with the terminal device.

In an embodiment of the disclosure, the processing circuitry of the host computer may be configured to execute a host application, thereby providing the user data. The processing circuitry of the terminal device may be configured to execute a client application associated with the host application.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one skilled in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described. It should be noted that two blocks shown in succession in the figures may, in fact, be executed substantially concurrently, or the blocks may sometimes be executed in the reverse order, depending upon the functionality involved.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method performed by a network node, comprising:
   obtaining, from a terminal device, a channel quality indication, CQI, value reported by the terminal device for an anchor physical resource block, PRB; and
   determining, for the anchor PRB, a first signal to interference plus noise ratio, SINR, of a downlink channel, based at least on the CQI value.

2. The method according to claim 1, further comprising:
   determining whether a difference between transmission powers on the anchor PRB and a non-anchor PRB is to cause the non-anchor PRB to have a different SINR than the first SINR; and
   determining, for the non-anchor PRB, a second SINR of the downlink channel, based at least on the first SINR and the determination of whether the difference between the transmission powers is to cause the non-anchor PRB to have a different SINR than the first SINR.

3. The method according to claim 2, wherein determining the second SINR of the downlink channel for the non-anchor PRB comprises:
   when the difference between the transmission powers is to cause the non-anchor PRB to have a different SINR than the first SINR, determining, as the second SINR, the first SINR minus the difference between the transmission powers on the anchor PRB and the non-anchor PRB; and/or
   when the difference between the transmission powers is not to cause the non-anchor PRB to have a different SINR than the first SINR, determining the second SINR to be equal to the first SINR.

4. The method according to claim 2, wherein determining whether the difference between the transmission powers is to cause the non-anchor PRB to have a different SINR than the first SINR comprises:
   determining whether a power of a reference signal received by the terminal device on the anchor PRB is smaller than or equal to a sum of a thermal noise and a noise figure.

5. The method according to claim 4, wherein when the power of the received reference signal is smaller than or equal to the sum, it is determined that the difference between the transmission powers is to cause the non-anchor PRB to have a different SINR than the first SINR; and
   wherein when the power of the received reference signal is larger than the sum, it is determined that the difference between the transmission powers is not to cause the non-anchor PRB to have a different SINR than the first SINR.

6. The method according to claim 4, wherein determining whether the difference between the transmission powers is to cause the non-anchor PRB to have a different SINR than the first SINR further comprises:
   determining a pathloss between the terminal device and the network node, based on a power headroom reported by the terminal device or a reference signal received power, RSRP, measured by the network node from the terminal device; and
   determining, as the power of the received reference signal, a difference between a predetermined transmission power of the reference signal and the pathloss.

7. The method according to claim 6, wherein when the power headroom is larger than zero, the power headroom is used to determine the pathloss; and
   wherein when the power headroom is smaller than or equal to zero, the RSRP is used to determine the pathloss.

8. The method according to claim 1, wherein the first SINR of the downlink channel is determined based further on an adjustment parameter capable of adjusting the first SINR.

9. The method according to claim 8, wherein the downlink channel is a narrowband physical downlink control channel, NPDCCH;

wherein a predetermined repetition level corresponding to the CQI value is adjusted by multiplying $2^n$, where n is the adjustment parameter used for NPDCCH; and wherein the adjusted repetition level is mapped to the first SINR based on a first predetermined table indicating mapping between multiple repetition levels and multiple SINRs.

10. The method according to claim 8, wherein the downlink channel is a narrowband physical downlink shared channel, NPDSCH; and wherein a predetermined repetition level corresponding to the CQI value is mapped to an intermediate SINR based on a second predetermined table indicating mapping between multiple repetition levels and multiple SINRs; and wherein the first SINR is determined as a sum of the intermediate SINR and the adjustment parameter used for NPDSCH.

11. The method according to claim 9, wherein the first predetermined table is determined based on a third predetermined table indicating mapping between the multiple repetition levels and multiple SINR ranges; and wherein for each of the multiple repetition levels, the first SINR of the repetition level satisfies following conditions:

(the first SINR of the repetition level−a downward adjustment step for NPDCCH)≤an upper limit of the SINR range of the next stronger repetition level; and (the first SINR of the repetition level+an upward adjustment step for NPDCCH)≥a lower limit of the SINR range of the previous weaker repetition level.

12. The method according to claim 10, wherein the second predetermined table is determined based on a fourth predetermined table indicating mapping between the multiple repetition levels and multiple SINR ranges; and wherein for each of the multiple repetition levels, the first SINR of the repetition level satisfies following condition:

(the first SINR of the repetition level−a downward adjustment step for NPDSCH)≤an upper limit of the SINR range of the next stronger repetition level.

13. The method according to claim 1, further comprising:

determining one or more link adaptation parameters for the terminal device based on the first SINR and/or the second SINR; and transmitting the one or more link adaptation parameters to the terminal device.

14. A method performed by a terminal device, comprising:

reporting, to a network node, a channel quality indication, CQI, value for an anchor physical resource block, PRB, wherein the CQI value is used for determining a first signal to interference plus noise ratio, SINR, of a downlink channel for the anchor PRB and/or a second SINR of the downlink channel for a non-anchor PRB.

15. The method according to claim 14, further comprising:

receiving, from the network node, one or more link adaptation parameters for the anchor PRB and/or the non-anchor PRB; and receiving a downlink transmission from the network node based on the one or more link adaptation parameters.

16. A network node comprising:

at least one processor; and at least one memory, the at least one memory containing instructions executable by the at least one processor, whereby the network node is operative to perform the method according to claim 1.

17. A terminal device comprising:

at least one processor; and at least one memory, the at least one memory containing instructions executable by the at least one processor, whereby the terminal device is operative to perform the method according to claim 14.

* * * * *